(12) United States Patent
Johnson et al.

(10) Patent No.: US 7,536,396 B2
(45) Date of Patent: May 19, 2009

(54) QUERY-AWARE SAMPLING OF DATA STREAMS

(75) Inventors: Theodore Johnson, New York, NY (US); Shanmugavelayutham Muthukrishnan, Washington, DC (US); Oliver Spatscheck, Randolph, NJ (US); Vladislav Shkapenyuk, Brooklyn, NY (US)

(73) Assignee: AT&T Intellectual Property II, L.P., New York, NY (US)

( * ) Notice: Subject to any disclaimer, the term of this patent is extended or adjusted under 35 U.S.C. 154(b) by 144 days.

(21) Appl. No.: 11/554,327

(22) Filed: Oct. 30, 2006

(65) Prior Publication Data

US 2007/0226239 A1 Sep. 27, 2007

Related U.S. Application Data

(60) Provisional application No. 60/784,314, filed on Mar. 21, 2006.

(51) Int. Cl.
 G06F 7/00 (2006.01)
 G06F 17/00 (2006.01)
(52) U.S. Cl. .................................. 707/100; 707/102
(58) Field of Classification Search ............... 707/1–3, 707/100–102, 103 R, 104.1
 See application file for complete search history.

(56) References Cited

U.S. PATENT DOCUMENTS

| | | | |
|---|---|---|---|
| 5,546,570 A * | 8/1996 | McPherson et al. ............. 707/4 |
| 5,822,593 A * | 10/1998 | Lamping et al. ............ 717/161 |
| 6,292,938 B1 * | 9/2001 | Sarkar et al. ................. 717/138 |
| 6,711,585 B1 * | 3/2004 | Copperman et al. ....... 707/104.1 |
| 2006/0010093 A1 | 1/2006 | Fan et al. |
| 2006/0038811 A1 * | 2/2006 | Owens et al. ................ 345/418 |
| 2006/0129540 A1 * | 6/2006 | Hillis et al. ..................... 707/3 |
| 2006/0200251 A1 | 9/2006 | Gu et al. |

OTHER PUBLICATIONS

Jia Liang Han (1995), Program partition and logic program analysis, pp. 959-968.*
Babcock et al., "Load Shedding Techniques for Data Stream Systems", MPDS 2003, [Online], Jun. 8, 2003, URL:http://www-cs-students.stanford.edu/{datar/papers/mpds03.pdf>.
Hwang et al., "High-Availability Algorithms for Distributed Stream Processing", ICDE 2005, [Online], Apr. 1, 2005, URL:http://www.cs.brown.edu/research/aurora/hwang.icde05.ha.pdf>.
Carney et al., "Monitoring Streams—A New Class of Data Management Applications", VLDB 2002, [Online], Aug. 1, 2002, URL:http://www.cs.brown.edu/research/aurora/vldb02.pdf>.
Carney et al., "Reducing Execution Overhead in a Data Stream Manager", MPDS 2003, [Online], Jun. 1, 2003, URL:http://www.cs.brown.edu/research/aurora/mpds03_scheduling.pdf>.

* cited by examiner

*Primary Examiner*—Don Wong
*Assistant Examiner*—Merilyn P Nguyen

(57) ABSTRACT

A system, method and computer-readable medium provide for assigning sampling methods to each input stream for arbitrary query sets in a data stream management system. The method embodiment comprises splitting all query nodes in a query directed acyclic graph (DAG) having multiple parent nodes into sets of independent nodes having a single parent, computing a grouping set for every node in each set of independent nodes, reconciling each parent node with each child node in each set of independent node, reconciling between multiple child nodes that share a parent node and generating a final grouping set for at least one node describing how to sample an input stream for that node.

18 Claims, 5 Drawing Sheets

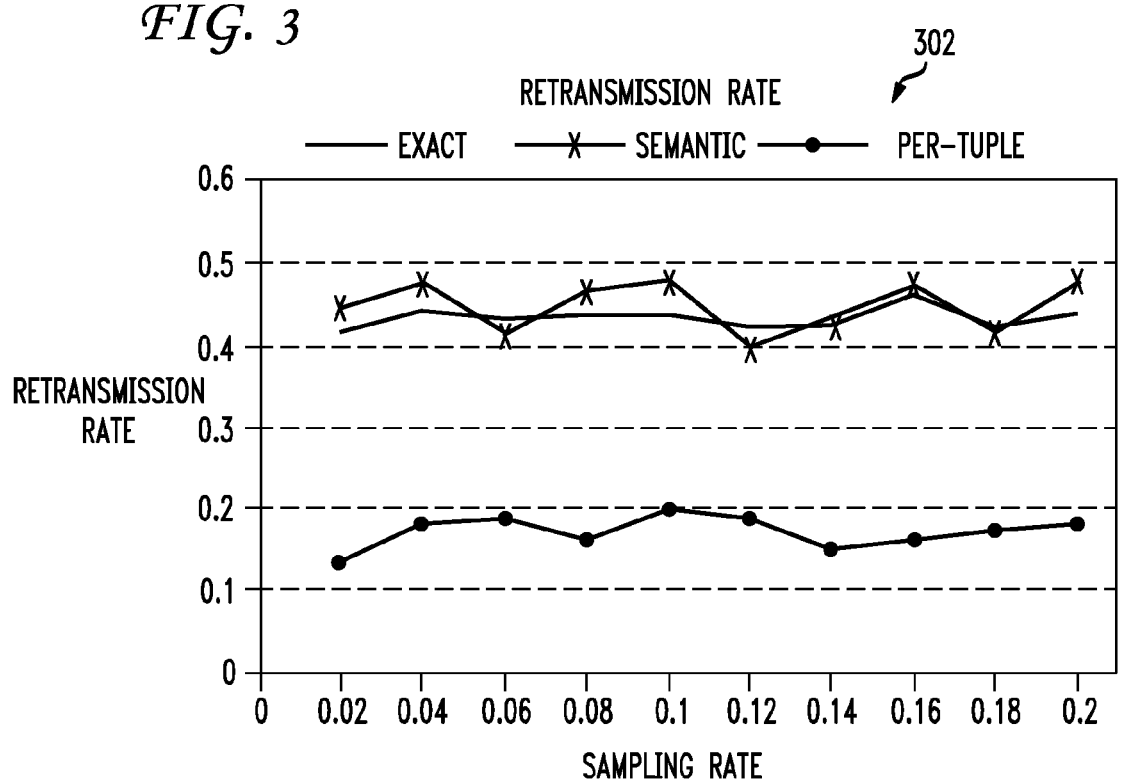
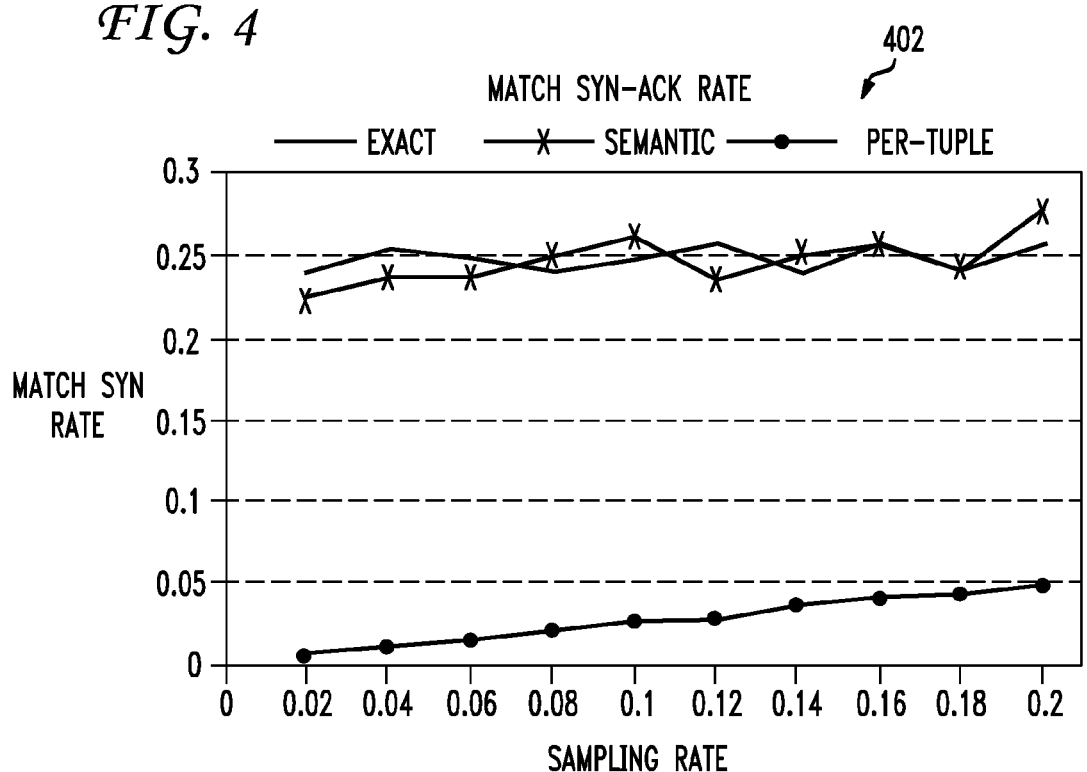

QUERY-AWARE SAMPLING OF DATA STREAMS

RELATED APPLICATION

This application claims the benefit of priority to U.S. Provisional Application No. 60/784,314, filed on Mar. 21, 2006. The prior application is incorporated herein by reference in its entirety.

BACKGROUND OF THE INVENTION

1. Field of the Invention

The present invention relates to data stream management systems and more specifically to a system and method of sampling data streams

2. Introduction

Data stream management systems (DSMS) have found applications in network monitoring and financial monitoring in which large volumes of data require sophisticated processing in real time. Commercial examples include Gigascope for network monitoring, and Aleri Streaming Analytics, Gemfire Real-time Events, and Streambase for financial monitoring.

High-speed data streams can be bursty. For example, there are flash events on the network when legitimate traffic spikes sharply. During a Distributed Denial of Service (DDoS) attack, the load on a link can increase from 100,000 packets/sec to 500,000 packets/sec. Trading volumes bursts on individual securities are common, and even occur in entire markets during financial panics. Two examples from the New York Stock Exchange are Oct. 19, 1987 and Oct. 28, 1997. Even if the DSMS is configured to handle a high volume data stream during normal circumstances, during a burst period the DSMS might exhaust available resources such as CPU cycles, memory, and link capacities.

It is precisely during such highly-loaded instants such as a DDoS attack that the DSMS is most useful and analysts rely on it crucially to identify the attackers and protect the network. Similarly, it is during a financial spike or market volatility that analysts rely on a DSMS in order to identify price trends and protect market positions. Therefore, it is critical to build DSMSs that can gracefully perform and provide useful results even in highly loaded instants. That is, DSMSs often have to target instantaneous—not average—data rates.

The widely accepted solution proposed for use by DSMSs to handle overloaded conditions is load shedding. In particular all published systems employ per-tuple sampling: uniform random sampling of tuples at different levels of query hierarchy to reduce the load on processing nodes. A tuple is a finite sequence of objects, each of a specified type. However, for a large class of queries, uniform random sampling violates the query semantics and leads to meaningless or even incorrect output.

As an example, consider the query for computing flows from the packet data—summaries of packets between a source and a destination during a period of time. The group-by attributes are the source and destination IP address, the source and destination port, and the protocol, while the aggregates include the number of packets, the number of bytes transferred, and so on. The example is one particular aggregate, i.e., the OR of the TCP flags in the packets that comprise the flow. This information is vital for distinguishing between regular flows and attack flows (attack flows do not follow proper TCP protocols).

If one randomly drops packets, one cannot compute the aggregate on the flags properly, and therefore cannot distinguish between valid traffic and attack traffic. Thus, a natural stream query written by an analyst to detect attack traffic will result in incorrect output in existing data stream systems that drop tuples randomly without analyzing the query semantics.

In principle, there is a different sampling strategy that will work in the example above, namely, to drop all packets that belong to randomly chosen flows. For all flows that are not dropped, the query will correctly compute the OR aggregate of the TCP flags and the output will be correct, albeit a subset of the correct output.

This type of sampling is referred to as per-group sampling, where the random choice is over the groups (in this case, the group is defined by the attributes that comprise the flow, but in general, it may be any subset of attributes). Per-group sampling is known as being necessary for computing loss-sensitive aggregates such as OR, Min, Max, count of duplicates, and so on. Join queries are also sensitive to random sampling, so variants of group sampling have been proposed for approximate query systems based on samples of large data sets.

In a general purpose DSMS, what is needed in the art is a principled mechanism to determine a suitable sampling strategy for any query.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The disclosure addresses the need to determine an improved sampling strategy for any query in a DSMS. This is not only a matter of choosing what sampling method to use, but also, where in the query to perform sampling, how to be consistent across different operators, how to coordinate the sampling rates across input streams and how to quantify and prove correctness properties of the output. One characterization of the proposed method is a query-aware method semantic sampling. Presented herein are semantic sampling methods and details regarding how to implement it effectively and present experimental results validating the approach. More precisely, several contributions in this disclosure are:

1. Introducing the concept of query-aware semantic sampling with a suite of tuple and per-group sampling and suitable notion of correctness in presence of sampling for any query.
2. Analyzing query sets to determine a semantics-preserving sampling strategy. For this, the concept of grouping sets being compatible with given query is introduced and show how to reconcile different grouping sets in a query set.
3. Validating the approach experimentally on real network traffic data streams.

By using the methods described herein, the inventors are able to provide semantically correct results even under adverse operating conditions, and avoid random sampling without guarantees.

The invention comprises a system, method and computer-readable medium storing computing device instructions for semantic sampling of network traffic flow. The method embodiment performs semantic sampling of network traffic flow by inferring from a query at least one compatible sampling method, selecting a sampling algorithm based on the inference, and sampling the traffic flow using the selected algorithm such that results reaming semantically correct.

Another method embodiment comprises a method of assigning sampling methods to each input stream for arbitrary query sets in a data stream management system, the method comprising: splitting all query nodes in a query directed acyclic graph (DAG) having multiple parent nodes into sets of independent nodes having a single parent, computing a grouping set for every node in each set of independent nodes, reconciling each parent node with each child node in each set of independent nodes, reconciling between multiple child nodes that share a parent node and generating a final grouping set for at least one node describing how to sample an input stream for that node.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 3 illustrates a graph of the accuracy of aggregate queries;

FIG. 4 illustrates a graph of the accuracy for a complex query set;

DETAILED DESCRIPTION OF THE INVENTION

Figure 1:
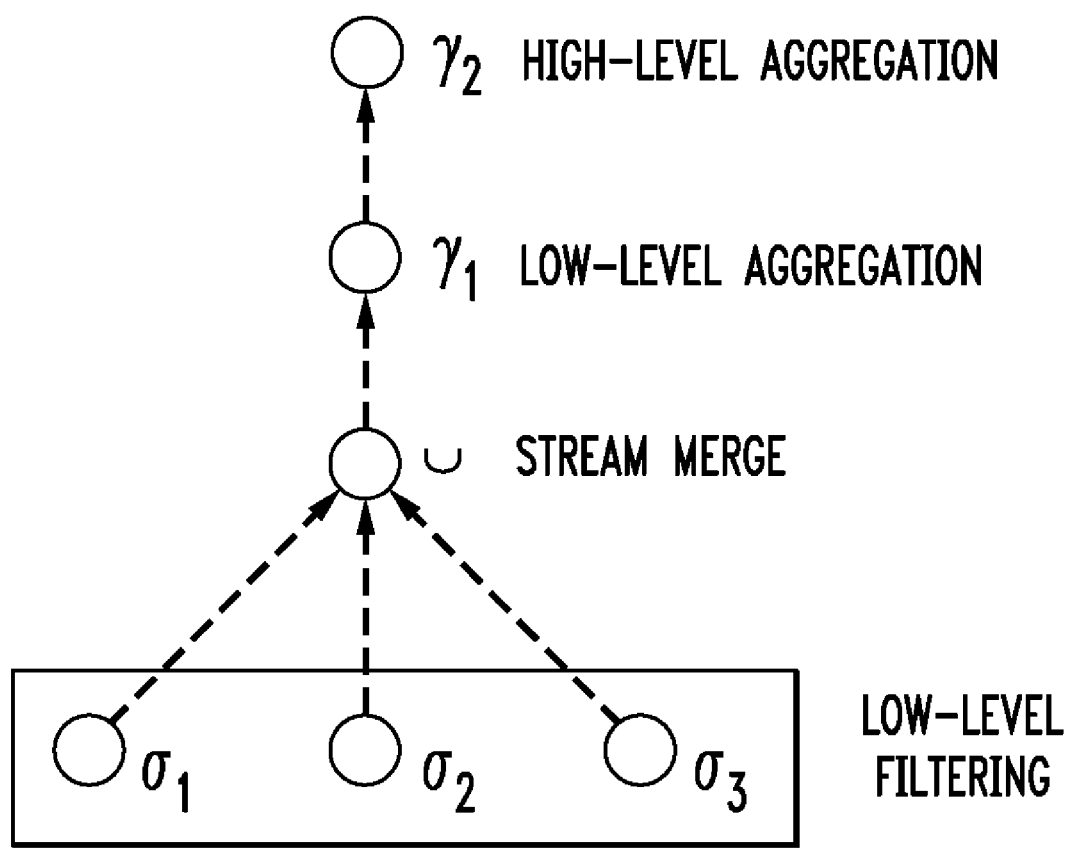
FIG. 1 illustrates a semantic filtering example.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Data Stream Management Systems are useful when large volumes of data need to be processed in real time. Examples include monitoring network traffic, monitoring financial transactions, and analyzing large scale scientific data feeds. These applications have varying data rates and often show bursts of high activity that overload the system, often during most critical instants (e.g., network attacks, financial spikes) for analysis. Therefore, load shedding is necessary to preserve the stability of the system, gracefully degrade its performance and extract answers.

Existing methods for load shedding in a general purpose data stream query system use random sampling of tuples, essentially independent of the query. While this technique is acceptable for some queries, the results may be meaningless or even incorrect for other queries. In principle, a number of different query-dependent sampling methods exist, but they work only for particular queries. This disclosure shows how to perform query-aware sampling that may be termed semantic sampling which works in general. Presented are methods for analyzing any given query, choosing sampling methods judiciously, and guaranteeing correct semantic execution of the query. Experiments on a high-speed data stream are also disclosed that demonstrate with different query sets that our method guarantees semantically correct and accurate results while being efficient in decreasing the load significantly. It is noted that none of the experimental data is meant to limit any claimed invention to any particular performance metric.

The area of data streaming has received a lot of attention in recent years, with research efforts ranging from developing streaming algorithms to designing and building Data Stream Management Systems (DSMS). A number of research DSMSs are currently being developed, including, as mentioned above, Aurora/Borealis, STREAM, TelegraphCQ, Gigascope and many others. Commercial DSMSs include products by Aleri, Gemstone, and Streambase. Two main approaches to gracefully handle high-load conditions have been explored: load shedding through per-tuple sampling and approximate query processing.

The load shedding mechanism relies on random tuple sampling to discard unprocessed tuples and reduce the system load. Sampling operators are placed at various points in query plans based on statistics accumulated during plan execution. The main goal is to minimize the inaccuracy of the results while keeping up with data arrival rates. In order to compensate for the effects of random sampling, aggregate results are appropriately scaled. This approach is suitable for estimating certain aggregates on sliding windows, but is not suitable for large class of aggregation queries that generate semantically incorrect results when presented with randomly sampled input (e.g., the OR of TCP flags).

The load shedding mechanism used in Aurora/Borealis is also based on random tuple sampling. The system additionally has a mechanism for dropping tuples based on their utility. A tuple's utility is computed based on Quality-of-Service (QoS) graphs that need to be specified for every application. Three types of QoS graphs can be used by the system: a latency graph specifies the utility of the tuple as a function of time to propagate through query plan, a loss-tolerance graph captures the sensitivity of the application to tuple loss, and a value-graph shows which attribute values are more important than others. Their mechanism is restricted to queries that do not change the values of the input tuples (such as filter and sort); thus it is not directly applicable to a wide variety of queries including aggregations. Even though one can approximate the benefits of per-group sampling by carefully constructing value-based QoS graphs, the burden of generating the appropriate QoS graph lies with the application writer, which tends to make it unwieldy.

Window-aware load shedding addresses the problem of preserving the correctness of the answer returned by aggregation queries over data streams. A proposed "window drop" operator drops entire windows instead of individual tuples and thus guarantees that output of the query is the subset of the correct output. The approach is restricted to sliding window aggregation queries and not easily applicable to arbitrary streaming queries containing combination of selection, aggregation merge and join operators.

A large number of algorithms has been suggested for approximate query processing. They can be divided into two main categories: sampling-based and sketch-based. Query-independent methods of uniform random and fixed-size reservoir sampling work only for certain queries. A variety of query-specific sampling methods have also been suggested. Examples include specialized techniques for computing quantiles, heavy hitters, distinct counts, subset-sums, set resemblance and rarity, etc. Unfortunately, these techniques do not apply beyond the computation of their intended aggregate functions and their interaction in a set of interrelated queries is not well understood. Similarly, there are sketch-based algorithms that are optimized for specific queries, such as particular types of joins or aggregations being computed, and cannot be easily combined in the same query. These limitations make it very hard to use these techniques in automated fashion, i.e. automatically inferring which approximation is safe to use just based on the query text.

The semantic sampling framework proposed herein automatically infers the sampling methods for every query in any given query set and guarantees the results remain semantically correct. In order to simplify the task, a suite of two sampling algorithms are considered: uniform random per-tuple sampling and per-group sampling. These are the most common sampling algorithms and together, they suffice for a large class of streaming queries involving aggregations, merges (stream union) and joins. Other sampling algorithms may also be used in connection with the invention.

A primary requirement of a DSMS is to provide a way to unblock otherwise blocking operators such as aggregation and join. Different DSMSs take different approaches, but in general they provide a way to define a window on the data stream on which the query evaluation will occur at any moment in time. Two main approaches for defining a window on a stream are sliding windows (both time- and tuple-based) and tumbling windows. In streaming systems that rely on tumbling windows, one or more attributes of a data stream are marked as being ordered. Query evaluation windows are determined by analyzing how a query references the ordered attributes. For example, consider the following schema.

PKT(time increasing, srcIP, destIP, len)

The time attribute is marked as being ordered, specifically increasing. Then the following query computes the sum of the length of packets between each source and destination IP address for every minute:

```
SELECT tb, srcIP, destIP, sum(len)
FROM PKT
GROUP BY time/60 as tb, srcIP, destIP
```

Similarly a join query on streams R and S must contain a join predicate such as R..tr=S.ts or R..tr/2=S.ts+1: that is, one which relates a timestamp field from R to one in S. An example of join query that combines the length of packets with matching IP addresses is shown below:

```
SELECT time, PKT1.srcIP, PKT1.destIP,
PKT1.len + PKT2.len
FROM PKT1 JOIN PKT2
WHERE PKT1.time = PKT2.time and
PKT1.srcIP = PKT2.srcIP and
PKT1.destIP = PKT2.destIP
```

These kinds of queries use tumbling window semantics in which the window covers only the current epoch. Tumbling windows can be used for the efficient evaluation of sliding window queries. Therefore, tumbling window semantics are assumed for the queries (except where otherwise noted) for simplicity. Although tumbling window semantics are preferred, other semantics may apply as well. For additional issues, see discussion below regarding temporal attributes.

By way of example, this disclosure illustrates the semantic sampling framework by working through an example query set. The first query (dup_and_all_count, denoted $\gamma_1$), a simplified version of TCP performance analysis, computes the number of duplicate packets and the total number of packets in each TCP flow in each one-minute window (making use of the User Defined Aggregate Function or UDAF, count_dups, equivalent to an aggregation subquery with a HAVING clause). The higher-level aggregation query (dup_ratio, denoted $\gamma_2$) computes the ratio of the duplicate packets to the total number of packet for each time window. The corresponding SQL statements for both queries are shown below:

```
Query dup_all_count:
  SELECT tb, count_dups(sequence_number) as dup_cnt, count(*)
  as full_cnt
  FROM TCP
  GROUP BY time/60 as tb, srcIP, destIP, srcPort, destPort;
Query dup_ratio:
  SELECT tb, sum(dup_cnt) / sum(full_cnt)
  FROM dup_and_all_count
GROUP BY tb;
```

Assume a person wants to run the queries over 3 data streams, so the aggregations need to be performed on their union. A query plan for execution of the queries is shown in FIG. 1.

First, a question: at which level in query hierarchy should sampling be performed? The goal is to achieve maximum load reduction without sacrificing the output quality. Intuitively, one should be sampling at the input streams $\sigma_1$, $\sigma_2$, and $\sigma_3$ to drop tuples before investing any time in partially processing them.

Next, what sampling method is needed for each input stream to guarantee that the output of top-level query is semantically correct? By analyzing the aggregate functions used in the query dup_all_count, one can infer that one of them cannot be approximated using random uniform sampling (in particular, the count_dup UDAF.) and therefore per-group sampling needs to be used. Since the count_dups UDAF counts the number of duplicate sequence numbers, it will return an accurate answer only if it aggregates over all tuples in the group. Instead of uniform random sampling of tuples, it is better to collect all tuples from a uniform random sample of the groups (defined by srcIP, destIP, srcPort, destPort), on which the count_dups aggregate will be computed exactly. Therefore, the output of query dup_all_count is a sample of the exact query output. An analysis of the query dup_ratio reveals that the aggregates it references (SUM) are easily approximated if the input is sampled; therefore per-group sampling of input streams guarantees the semantically correct output for the full query tree, while per-tuple sampling does not have this property.

Another question of value is how does one guarantee the consistency of sampling for all input streams? Since the multiple streams are sampled, needs to guarantee consistency of output of the merge. That is achieved by using the same sampling method (for example, per-group sampling using the identical group) for each of the streams.

Next, how does one preserve the metadata describing which sampling methods and sampling rates were used to compute the result? Load shedding subsystems are expected to dynamically adjust the sampling levels based on current load conditions. It is therefore important for an application to know exactly what sampling method was used and what were the rates to be able interpret the results and to reason about confidence bounds. In a preferred implementation this metadata is preserved by regularly embedding special punctuations into query output stream describing sampling strategy used to compute the results.

Next, the problems are formally defined and this disclosure presents the framework for semantic sampling analysis that addresses them. In order to reason about whether a particular sampling method guarantees semantically correct results for a given query, a formal definition is needed: Def. Sampling method M is strongly compatible with a query Q if for every time window, the output of the query is a subset of the exact output Q would produce if no sampling was used.

While strongly compatible is useful, it does not allow the use of approximations in aggregation queries. Hence: Def. Sampling method M is weakly compatible with a query Q if it is strongly compatible, except that fields which are the result of aggregate functions are "good approximations" to the exact values.

Weak compatibility is used as the test as to whether a sampling method can be used with a query. The measure of "good approximation" depends on the aggregate function. For example, aggregate functions such as sums, counts and quantites, can be adjusted to give good approximations when used with sampled input. Other aggregate functions, such as MIN, MAX, (bitwise) OR, or count_dups, cannot provide good approximations on sampled input, and therefore are not even weakly compatible with tuple sampled input.

Consider by way of an example suite of sampling algorithms, two classes of sampling methods: per-tuple and per-group sampling. Per-tuple sampling is done by uniformly randomly dropping a fraction of tuples from the input stream. This method is independent of the queries that are running in the system and does not need to examine the tuple content to make a decision whether to drop tuple or not. It is inexpensive and works well for selection queries and for aggregation queries that have "good approximations" based on uniform sample of the input. E.g., SUM and COUNT can be approximated by dividing the value of the aggregate by sampling rate—and therefore are weakly compatible. However, per-tuple sampling is not compatible with queries involving more sophisticated aggregates. Further, per-tuple sampling also leads to poor results for join queries. There are two main reasons why uniform sampling is inappropriate for join queries:

The join of two streams that were uniformly sampled is not a uniform sample of the output of the join. As a result the confidence bounds for the output are significantly degraded.

The cardinality of the output of k-way join whose input were per-tuple sampled with rate $\alpha(\alpha \in (0, 1])$ is $\alpha^k$ of the cardinality of the exact answer. As a consequence, result is less accurate and has low confidence bounds as k increases.

Intuitively, one would like to restrict the use of per-tuple sampling to the following scenarios: 1. When one is looking for tuples with very specific content. For example, an application in network monitoring is to capture packets with questionable (worm, attack, P2P) payloads. 2. When one is more interested in the analysis of the group themselves rather than the particular aggregate values for the groups. Examples of such queries are finding ranges of IP addresses, or estimating fraction of one type of traffic to another (e.g. kazaa vs bittorrent). 3. When it is possible to infer the missing values or the aggregates can be easily estimated based on the random sample of the data. Examples of such aggregates are SUM, CNT, quantites.

Exact rules for deciding whether per-tuple sampling is compatible with a given query are provided below. Per-group sampling works by partitioning the tuples of the input stream into disjoint groups, and either sampling all the tuples from the group or dropping the group entirely. Def. Let A be a set of the tuple attributes ($attr_1, attr_2, \ldots, attr_n$) and H be a hash function with large integer domain [0, R]. Per-group sampling with rate $\alpha \in (0, 1]$ selects a tuple iff $H(attr_1, attr_2, \ldots, attr_n) \leq \alpha * R$. The attribute set A is called a grouping set.

The main property of per-group sampling is exact computation of all aggregate functions for all tuples in the output. Consider our motivational aggregation query:

```
SELECT tb, srcIP, destIP, srcPort, destPort,
count_dup(sequence_number)
FROM TCP
  GROUP BY time/60 as tb, srcIP, destIP, srcPort, destPort;
```

Per-group sampling with grouping set (srcIP, destIP, srcPort, destPort) will guarantee that for every sampled group the value of count_dup( ) aggregate will be computed correctly. In general per-group sampling is preferable for queries that are interested in complex properties of groups which cannot be easily estimated based on a random sample. Examples include count_dups, MIN, MAX and (bitwise) OR.

Another class of queries for which per-group sampling is preferable is computing a join between two streams or any type of correlating data by group. Work on join synopses and hierarchical group-based sampling use the variants of the per-group sampling approach to achieve high accuracy for join results.

A useful component of the semantic sampling framework disclosed herein is the analysis of the query structure to infer compatible sampling methods. The disclosure begins with the analysis of individual queries consisting of single streaming operators (selection, aggregation, or join), or ensembles consisting of aggregation or join plus selection and projection. Shown herein is how to infer which sampling method is compatible with a given query. Whenever per-group sampling is the strategy of choice, the disclosure shows how to choose the grouping set to be used for sampling. Individual query analysis allows the system to reason about the semantics of the query output and will be used as a building block for analyzing complex query sets.

Recall that per-group sampling hashes the set of tuple attributes called the grouping set to a large domain and selects only those tuples that hash into a subset of the domain. Essentially the grouping set defines a partitioning of the domain of tuple values and per-group sampling only selects a random sample of partitions. A question that can be addressed is which attributes should be chosen for a grouping set, such that per-group sampling using the set will result in semantically correct query results. This requirement for grouping sets is formalized in a definition: Def. Grouping set GS for the stream S is compatible with a query Q on S if per-group sampling using GS is strongly compatible with query Q.

```
Consider the following query Q:
    select time/60, srcIP, destIP, max(len)
    from S
    group by time/60, srcIP, destIP;
```

Intuitively, a compatible grouping set partitions the domain of tuple values such that any pair of tuples that have identical values of the grouping attributes will fall in the same partitions. For the query above, the trivial example of compatible grouping set is the set of its group-by attributes {time/60, srcIP, destIP}. It is easy to observe that grouping set consisting of any non-empty subset of {time/60, srcIP, destIP} is also compatible with a query. More formally, the requirements for compatible grouping sets can be stated in the following way:

Lemma. Let G be a set of group-by attributes referenced by the query Q and H be a hash function used for per-group sampling. Grouping set GS is compatible with a query Q iff for any pair of tuples tup1 and tup2 G(tup1)=G(tup2)⇒H(GS(tup1))=H(GS(tup2)).

In addition to using the subsets of the group-by attributes, new compatible grouping sets can be formed by using scalar expressions defined on group-by attributes. An example of such compatible grouping set for the query above is {(time/60)/2, srcIP & 0xFFF0, destIP & 0xFF00). An example of an incompatible grouping set for the query above is {time, srcIP, destIP} (since the fact that time1/60=time2/60 does not imply that H(time1)=H(time2)).

The rules for choosing the grouping sets are listed below for two query types that use per-group sampling: aggregations and joins.

One issue that is preferably considered when selecting a grouping set compatible with a given query is whether to include the temporal attributes. Selecting the temporal attribute in a grouping set will effectively change the hash function used by a sampling method whenever the time epoch changes. This property could be desirable if we want to ensure good coverage of all groups. The periodicity of the sampling change can be controlled by changing the value of the scalar expression involving the temporal attribute. For example, an aggregation query that uses time/60 to aggregate in one-minute time buckets can use time/60/10 as a member of a grouping set to change the hash function every 10 minutes.

For most of the aggregation and join queries, it is impossible to guess whether periodically changing the set of sampled groups is desirable based just on the query text. One approach is to make this choice a user option. It may be automatic or semi-automatic as well. For sliding window queries that use pane-based evaluation, changing the hashing function in the middle of a window will lead to incorrect query results. Therefore it is preferable to remove the temporal attributes from the grouping sets of such queries.

In its general form an aggregation query has the following format:

```
SELECT expr_1, ... ,expr_n
FROM STREAM_NAME
WHERE tup_predicate
GROUP BY temp_var, gb_var_1, ...,gb_var_m
HAVING group_predicate
```

Compatible grouping sets for an aggregation query will have the following form:

{sc_exp(gb_var$_1$), . . . , sc_exp(gb_var$_n$)} where sc_exp(x) is any scalar expression involving x. Given that there is infinite number of possible scalar expression, every aggregation query has an infinite number of compatible grouping sets. Furthermore any subset of compatible grouping sets is also compatible.

A restricted class of join queries is considered, namely two-way equi-join queries that use the semantics of tumbling windows. The general form of such query has the following format:

```
SELECT expr_1, ... ,expr_n
FROM STREAM1 {LEFT|RIGHT|FULL} [OUTER]JOIN STREAM2
WHERE STREAM1.ts = STREAM1.ts and STREAM1.var_{11} =
   STREAM2.var_{21}
and ...
   STREAM1.var_{1k} = STREAM2.var_{2k} and
   other_predicates;
```

Since a join query has 2 input streams that are independently sampled, two compatible grouping sets—LEFT and RIGHT should be defined. The LEFT compatible grouping set will have the following form: {sc_exp(STREAM1.var$_{11}$), . . . , sc_exp(STREAM2.var$_{1k}$)} while RIGHT compatible set will be in a form of {sc_exp(STREAM2.var$_{21}$), . . . , sc_exp(STREAM2.var$_{2k}$)}. As before, any subset of a compatible set is also compatible with additional restriction that LEFT and RIGHT compatible sets must use the same subset.

In general it is difficult to determine the best sampling strategy for a query since the query text does not necessarily reveal the importance of different attributes to the output. Even though a system could require query writer to explicitly specify the sampling method to be used to shed the load in overload situations, it is desirable to automatically infer the compatible strategy to the extent possible just based on the query. Furthermore, automatic selection of the sampling strategy is critical for complex query sets with multiple interconnected queries that have different tolerance to sampling.

Rules are next presented that are used for automatically choosing per-tuple or per-group sampling for major classes of streaming operators: selection, aggregation and join. For some operators, both sampling methods will be acceptable in which case suggestions are made on how to break the ties.

Selection/projection queries perform filter operation on the input stream only allowing tuples that pass the selection predicates. Both per-tuple and per-group sampling methods are strongly compatible with this type of queries according to our definition of compatibility. For standalone queries, per-tuple sampling is clearly preferable due to lower processing overhead—there is no need to read tuple attributes. However, other queries that consume the query's output stream might affect the choice of compatible sampling. Below is presented the algorithm that selects the compatible sampling method for the query taking into account all the queries that consume its output stream.

The appropriate sampling method for aggregation queries largely depends on the intent of the query writer, which is not always evident just based on a query text. Consider the following aggregation query that computes the statistics for TCP flows:

```
SELECT tb, srcIP, destIP, srcPort,
   destPort, sum(len), count(*)
FROM TCP
GROUP BY time/60 as tb, srcIP, destIP,
   srcPort, destPort;
```

If one is interested in getting maximum number of flows (e.g. to use it to compute the ratios of different types of flows), than he or she will be willing to tolerate the inaccuracy of sum( ) and cnt( ) aggregates. In that scenario uniform random sampling is the most appropriate and cheapest method. If on other hand, one does not care about capturing all the flows, but are very sensitive to errors in aggregate values, per-group sampling is preferable. Ideally one would want query writers to explicitly state their intent and tolerance to different sampling methods in the query language. However, it is not practical to expect the users to take the burden of explicitly labeling all the query nodes with acceptable sampling strategies. Explicit labeling is made more complicated by the complex interrelations between the queries in the query sets. Therefore one would like to automatically infer the safe sampling strategy just based on query text that would guarantee that output remain semantically correct, even if it potentially could be inferior to an explicit sampling specification.

The following rules are proposed for selecting sampling methods for aggregation queries: 1. If all the aggregate function computed in the query can be easily estimated based on random uniform sample (e.g. SUM, CNT, quantiles, etc) both per-group and per-tuple sampling are compatible with a query; 2. If at least one of the aggregate functions referenced in a query is incompatible with random uniform sampling (e.g. count duplicate, OR aggregation, etc) per-group sampling must be used; 3. If aggregation query has a HAVING clause referencing the aggregate values, per-group sampling must be used. The intuition behind this rule is that by providing HAVING clause for aggregate values query writer signifies the importance of exact computation of aggregate values; and 4. All user-defined aggregate functions (UDAFs) must be explicitly labeled by the authors to specify whether they are sensitive to uniform random sampling or not. This information allows us to treat UDAFs as any other aggregate function when deciding which sampling strategy is compatible with the query.

A merge query performs a union of two streams R and S in a way that preserves the ordering properties of the temporal attributes. R and S must have the same schema, and both must have a temporal field, say t, on which to merge. In order to preserve the abstraction of having one large stream, the sampling of merged streams should be coordinated. Similar to selection/projection queries, both sampling methods are compatible; in addition both streams should be sampled using the same method with the same sampling rates. Additional restrictions on load shedding strategy might be placed by other queries that consume the merged stream.

In a query language with tumbling window semantics, a join between two data streams R and S should contain an equality predicate that relates a timestamp from R to one in S. In addition to this special equality predicate, join queries might contain any number of other predicates relating the attributes from two streams. Consider the join query below that correlates two streams of TCP packets with matching source and destination IP address.

```
SELECT TCP1.tb, TCP1.srcIP,
TCP1.len + TCP2.len
FROM TCP1 JOIN TCP2
WHERE TCP1.srcIP=TCP2.destIP
  and TCP1.tb = TCP2.tb;
```

Both per-tuple and per-group sampling using join attributes guarantee that the output of the query for every time bucket tb will be a subset of the exact output and therefore satisfy our definition of compatible sampling method. However, using per-tuple random uniform sampling with sampling rate R reduces the effective sampling rate to $R^2$. Per-group sampling with rate R using srcIP for stream TCP1 and destIP for stream TCP2 k, keeps the query effective sampling rate at R and is therefore preferable. In general we will always use per-group sampling for join queries except in the special case where the only attribute in the join equality predicates is temporal attribute. In that special case, both per-tuple and per-group sampling are acceptable.

Data stream management systems are expected to run large number of queries simultaneously; queries in turn may contain a number of different query nodes (selections, aggregations, merges, and joins). Each of the nodes might place different requirements for range of acceptable sampling methods.

Example: Consider the following query set:

```
Query flow_dup_count:
  SELECT tb, srcIP, destIP, srcPort, destPort, count_dups(seq_nbr) as
  dup_cnt
  FROM TCP
  GROUP BY time/60 as tb, srcIP, destIP,
    srcPort, destPort;
Query max_dups:
  SELECT tb, srcIP, destIP, MAX(dup_cnt)
  FROM flow_dup_count
  GROUP BY tb, srcIP, destIP;
```

Query flow_dup_counts computes the number of duplicate packets in each TCP flow; query max_dups computes the maximum number of duplicates for each pair of communication hosts. Query flow_dup_count requires per-group sampling to be used with a compatible grouping set of the form of {sc_exp(srcIP), sc_exp(destIP), sc_exp(srcPort), sc_exp(destPort)} or any of its non-empty subsets. Query max_dups, on other hand, requires the input stream to be per-group sampled using {sc_exp(srcIP), sc_exp(destIP)}. Considering both grouping sets we can infer that per-group sampling of TCP stream using {sc_exp(srcIP), sc_exp(destIP)} will satisfy both queries. A similar inference is required for join queries whose child queries have different grouping sets.

An example analysis framework follows that infers the set of compatible sampling methods for arbitrary Directed Acyclic Graph (DAG) of streaming query nodes.

The placement of the sampling operators in a query DAG affects the effectiveness of load shedding mechanism. One choice is to perform sampling directly on the stream source before processing tuples by low-level operators. Shedding tuples as early as possible avoids investing processing time into computation of aggregate tuples that may eventually be discarded. Dropping tuples at higher-level nodes in query tree is generally less efficient and makes reasoning about the semantics of answers more difficult. One scenario in which sampling on non-leaf query node is justifiable is when output of a query is shared by multiple consumers with different tolerance to the rate with which input stream is sampled. In the preferred embodiment, only leaf-level sampling is considered.

Previously was discussed the need to reconcile the different requirements two queries might have for compatible grouping set to generate a new grouping set compatible with both queries. This issue is abstracted using Reconcile_Group_Sets( ), defined as follows: Def. Given two grouping set definitions GS1 for query Q1 and GS2 for query Q2, Reconcile_Group_Sets( ) is defined to return the largest grouping set Reconciled_GS such that per-group sampling using Reconciled_GS is strongly compatible with both Q1 and Q2.

Considering a simple case of grouping sets consisting of just the stream attributes (no scalar expressions involved), Reconcile_Group_Sets( ) computes the intersection of two grouping sets. For example Reconcile_Group_Sets({srcIP, destIP}, {srcIP, destIP, srcPort, destPort},) is a set {srcIP, destIP}. For more general case of grouping sets involving arbitrary scalar expressions Reconcile_Group_Sets uses scalar expression analysis to find "least common denominator". For example Reconcile_Group_Sets ({sc_exp(time/60), sc_exp(destIP), sc_exp(destIP)}, {sc_exp(time/90}, sc_exp (srcIP & 0xFFF0)}) is equal to a set {sc_exp(time/180, sc_exp(srcIP & 0xFFF0)}. The Reconcile_Group_Sets function can make use of either simple or complex analysis based on implementation time that is available. A full discussion is beyond the scope of this paper, but we expect that the simple analyses used in the example will suffice for most cases.

Next, an example algorithm is presented for assigning the sampling methods to each of the input stream for arbitrary query sets. The algorithm takes a query DAG as an input and produces labelling of the leaf-nodes with the compatible sampling method. The algorithm is comprised of the following stages:

The query DAG is transformed by splitting all the query nodes that have multiple parent nodes into at least one set of independent nodes that have a single parent. Since it is possible that multiple copies of the same query nodes will get assigned conflicting sampling methods, final reconciliation is preferably performed in the final stage of the algorithm.

Two classes of query nodes may be identified for which the system cannot produce a compatible sampling strategy:

Aggregation queries in which none of the grouping attributes that can be expressed as a scalar expression involving an attribute of the source stream (e.g. grouping attributes is result of aggregation computed in lower-level query).

Join queries that do not contain an equality predicate involving attributes of the source streams.

These types of nodes are labelled as sampling-unsafe, since their output results cannot be approximated.

In this phase of the algorithm the system reconciles sampling requirements of all dependent query nodes in the query set. An example reconciliation algorithm involves receiving as input topologically sorted list of nodes in the query tree $V_1$, $V_2 \ldots, V_n$ and outputting a labelling of the leaf-nodes with the compatible sampling method. The output of the algorithm is a description of how data in the stream should be dropped. In other words, the particular data dropped as instructed by the algorithm will provide much better results in the data stream management that dropping data the standard way.

An example algorithm is as follows:
1. For every $i \in [1$ to $n]$, compute $GS(V_i)$. For binary operators compute $GS_{left}(V_i)$ and $GS_{right}(V_i)$. If the node is compatible with per-tuple sampling, set $GS(V_i)$ to the union of all attributes of input schema. If no compatible sampling strategy exists, set $GS(V_i)=\emptyset$. This step involves for every node computing the grouping set the single node grouping analysis discussed above may be used.
2. For every $i \in [1$ to $n]$
    If $V_i$ is unary operator with child node $V_j$, sct $GS(V_j)$=Reconcile_Group_Sets($GS(V_i)$, $GS(V_j)$). This step involves traversing a straight line for each child and parent node shown in FIG. 2 and reconciling each child node with its parent node. So node 206 is reconciled with node 210, which node is then reconciled with node 212. Each "straight line" of nodes is reconciled in this manner.
    If $V_i$ is binary operator with child node $V_{left}$ and $V_{right}$, sct $GS(V_{left})$=Reconcile_Group_Sets($GS(V_i)$, $GS(V_{left})$) and $GS(V_{right})$=Reconcile_Group_Sets($GS(V_i)$, $GS(V_{right})$. This step involves performing reconciliation between children nodes such as node 206 and node 208. This is done for each two nodes that share a parent.
3. For every pair of nodes $V_i$ and $V_j$ s.t. $V_i$ and $V_j$ share common ancestor, set $GS(V_i)$=$GS(V_j)$=Reconcile_Group_Sets($GS(V_i)$, $GS(V_j)$)

Figure 2:
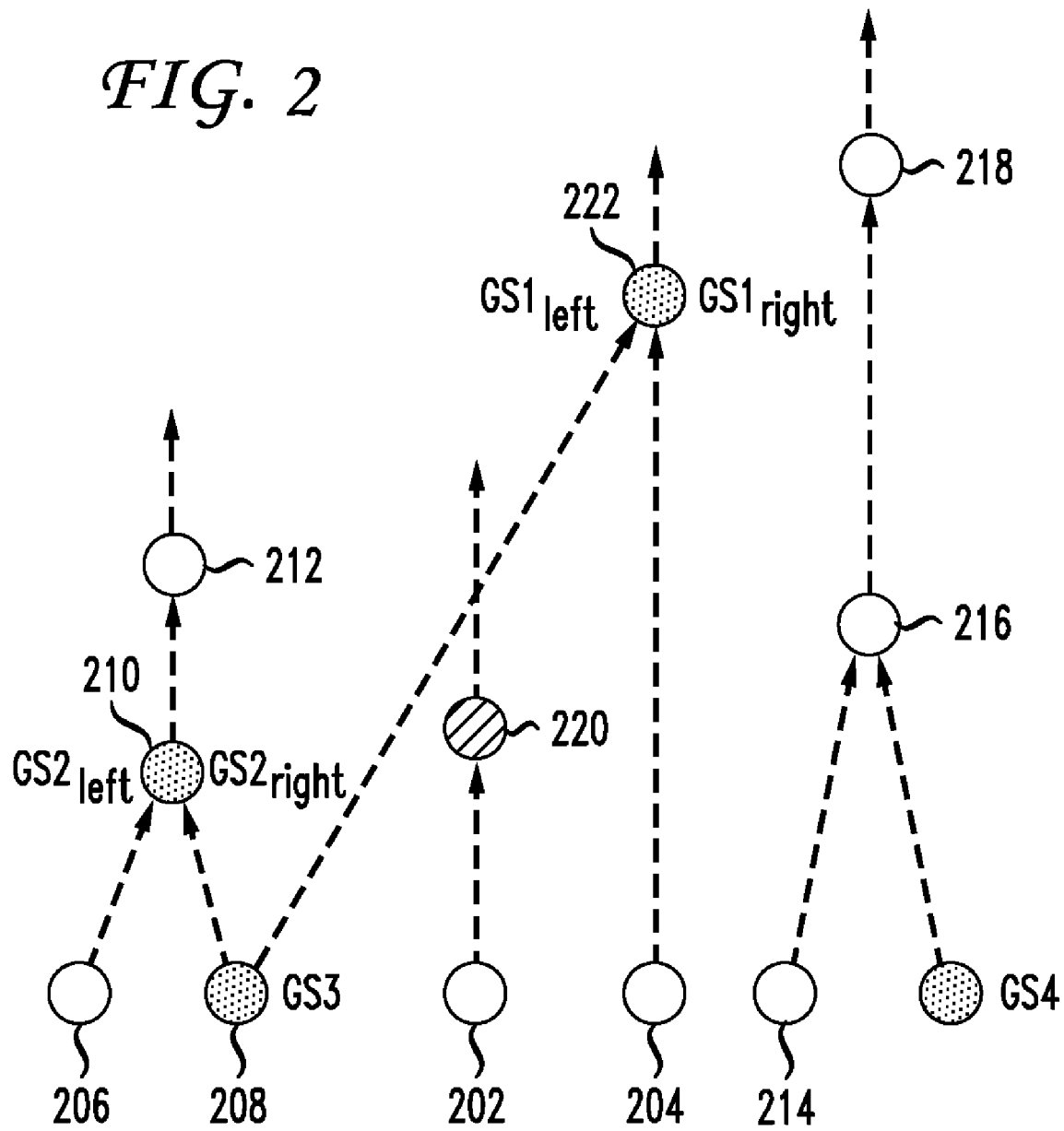
FIG. 2 illustrates labeling nodes in the query set.

Next, the query forest is transformed back into a query DAG. Remember that in the first phase of the algorithm the nodes that have multiple parents are split to form a forest. FIG. 2 illustrates the forest. In order to guarantees that multiple copies of the same node were not assigned a conflicting grouping sets the system performs a final reconciliation of previously split nodes. All the split nodes that cannot be reconciled (result of the Reconcile_Group_Sets( ) is an empty set) are kept separate as independent instances of a query that use two different sampling methods. After children get reconciled with parents and each two (or more) children that share a parent or parents get reconciled, the final grouping set(s) for each leaf node is the output.

Figure 6:
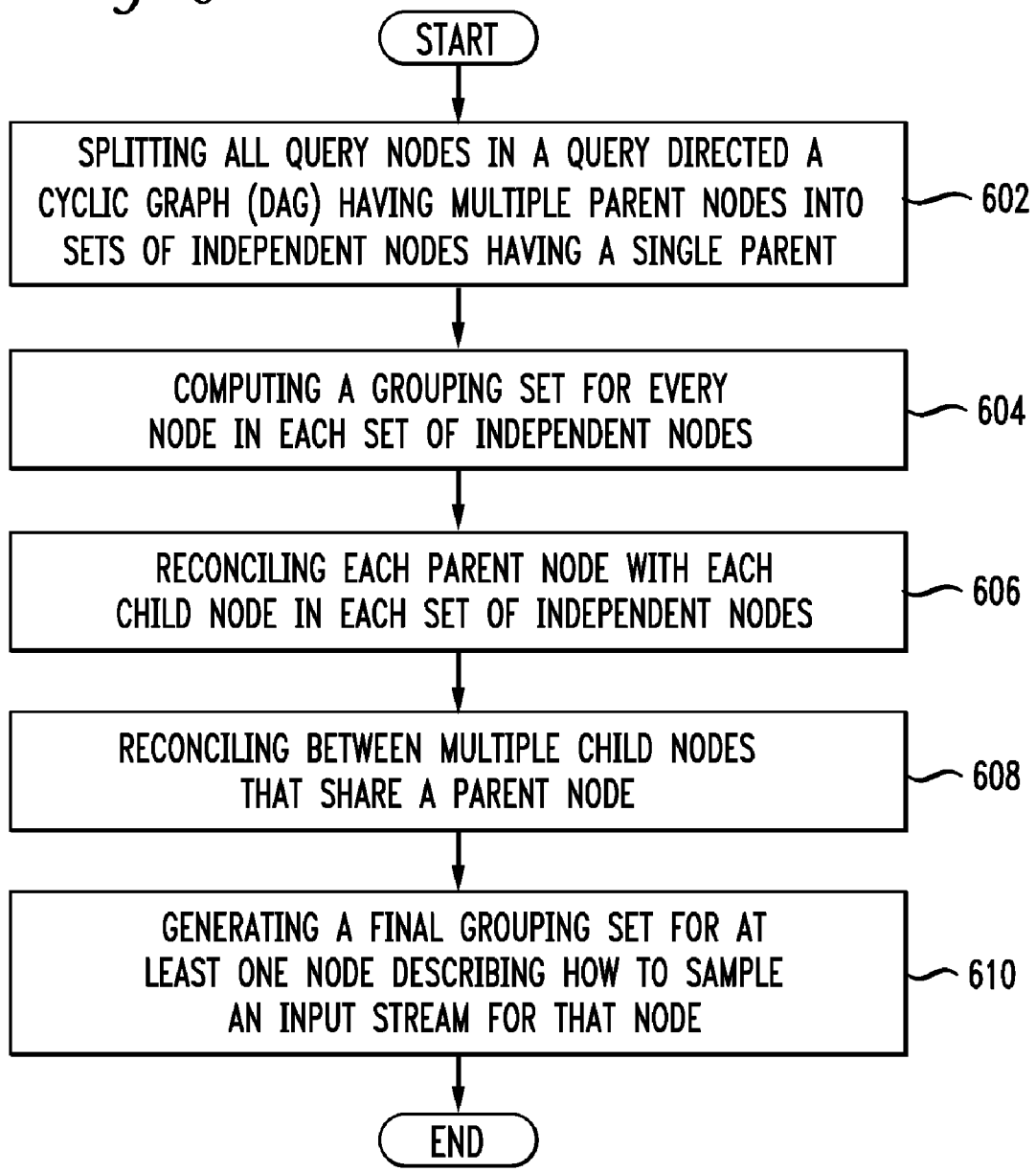
FIG. 6 illustrates a method embodiment.

FIG. 6 illustrates steps that relate to a method embodiment. A method of assigning sampling methods to each input stream for arbitrary query sets in a data stream management system may comprise one or more of the following steps: splitting all query nodes in a query directed acyclic graph (DAG) having multiple parent nodes into sets of independent nodes having a single parent (602), computing a grouping set for every node in each set of independent nodes (604), reconciling each parent node with each child node in each set of independent nodes (606), reconciling between multiple child nodes that share a parent node (608) and generating a final grouping set for at least one node describing how to sample an input stream for that node (610). The system may label sampling unsafe nodes. Grouping sets may be computed for every node using a single node grouping set analysis or some other type of analysis.

One example of a final group set is that it may be characterized by a labeling of each leaf node with a compatible sampling method. The final grouping set may be used to describe what records should be dropped by the data stream management system. A data stream management system may implement sampling associated with the final grouping set for at least one node based on a threshold associated with flow of data stream records or some other mechanism such as manual intervention or other type of automated trigger based on internal or external factors.

Experiments are presented next with semantic sampling in the context of the Gigascope streaming database. Gigascope is a high-performance streaming database designed for monitoring of the networks with high-rate data streams. Both per-group and per-tuple sampling are implemented by augmenting query plans with additional selection predicates implementing corresponding sampling method. All sampling predicates were pushed to leaf nodes in query execution plan by query optimizer.

All the experiments were conducted on a live network feed from a data center tap. All queries monitor the set of two high-speed DAG4.3GE Gigabit Ethernet interfaces. Both Gigabit interfaces receive approximately 100,000 packets per second (about 400 Mbits/sec). The main goal was to compare the accuracy of the query results for a system that uses random uniform sampling as a load shedding mechanism to accuracy achieved using semantic sampling. Also evaluated was the effectiveness with which both approaches can reduce the overall system load. All experiments were conducted on dual processor 2.8 GHz P4 server with 4 GB of RAM running FreeBSD 4.10.

In this experiment, it was observed how the accuracy of the results produced by sampling-sensitive aggregation queries is affected by the choice of sampling strategy. The queries used in experiment analyze the network performance by measuring the number of TCP packets that needed to be retransmitted due to packet loss. Monitoring retransmission rates is widely used by network analyst for analyzing the quality of end-to-end communications in managed network. The query dup_all_count computes the number of duplicate sequence numbers for each network flow identified by (srcIP, destIP, srcPort, destPort) as well as total number of packets in a flow. The results from query dup_and_all_count are further aggregated in query dup_ratio that for every 60 second time bucket computes the ratio of duplicate TCP packets to total number of packets sent. Corresponding GSQL queries dup_all_count: and dup_ratio are shown below.

```
Query dup_all_count:
    SELECT tb, count_dups(sequence_number) as dup_cnt,
    count(*) as full_cnt
    FROM TCP
    GROUP BY time/60 as tb, srcIP, destIP, srcPort, destPort;
Query dup_ratio:
    SELECT tb, sum(dup_cnt) / sum(full_cnt)
    FROM dup_and_all_count
    GROUP BY tb;
```

The sampling rates were varied from 0.02 to 0.2, which is typical range for network monitoring applications. For a given sampling rate, all three queries were run at the same time. The results 202 of the experiments are presented in FIG. 2. A baseline configuration computing exact TCP retransmission rates (no sampling) is compared with semantic sampling and per-tuple sampling. For a given sampling rate, all three queries were run at the same time. The results 302 of the experiments are presented in FIG. 3.

FIG. 3 demonstrates that semantic sampling achieves accuracy from 91 to 98%, while uniform random sampling prevents count_dups( ) aggregate from detecting large number of duplicate sequence numbers and leads to misleading results.

Another experiment related to semantic sampling for query sets. In this experiment, it was observed how the choice of sampling strategy affects the accuracy of query sets involving multiple aggregation and join queries. The query set used in this experiment is designed to detect a particular type of Distributed Denial of Service (DDoS) attack known as a SYN-flood. During a SYN-flood, the attacking hosts send a large number of SYN packets with spoofed random IP addresses, which forces the victim host to wait forever for matching SYN ACK packets. To detect a SYN-flood attack, the ratio of TCP SYN packets that have corresponding SYN ACK packets were computed. The query matched_syn_count computes the join between the stream of SYN and SYN ACK packets and aggregates the results by computing the total number of matched SYN packets for every 60 second time bucket. The query all_syn_count computes the total number of SYN packets observed in the same timebucket, while matched_syn_ratio computes the ration of matched SYN packets to total number of SYN packets:

```
Query mached_syn_count:
    SELECT tb, count(*)
    FROM tcp_syn S JOIN tcp_syn_ack A
    WHERE S.srcIP = A.destIP
```

```
    and S.destIP = A.srcIP
    and S.srcPort = A.destPort and
    S.destPort = A.srcPort and S.tb = A.tb
        and (S.timestamp <= A.timestamp)
        and (S.sequence_number + 1) =
        A.ack_number
    GROUP BY time/60 as tb;
Query all_syn_count:
    SELECT tb, count(*) as cnt
    FROM tcp_syn S
    GROUP BY time/60 as tb;
Query matched_syn_ratio:
    SELECT A.tb, M.cnt / A.cnt as ratio
    FROM all_syn_count A OUTER_JOIN matched_syn_count M
    WHERE A.tb = M.tb;
```

As in previous experiments, the sampling rate was varied from 0.02 to 0.2 in 0.02 increments. A baseline configuration computing the exact ratio of matched SYN packets (no sampling) was compared with semantic sampling and per-tuple sampling. The results 402 of the experiments are presented in FIG. 4.

The results of the experiment confirm that semantic sampling maintains the correct semantics of the output results with observed accuracy in 91-99% range. Uniform random sampling on other hand again leads to misleading results and suggests that there is a SYN flood attack in progress while in fact the ratio of matched SYN packets is within norm.

Another experiment evaluated the effectiveness of different sampling techniques at reducing the overall system load. The query set from the semantic sampling experiment above was used and the effect of sampling the input stream on average CPU load was observed. Even though the experiments were conducted on live data stream and the load conditions changed slightly from one experiment to another, overall the stream load was stable and the comparison results are still valid.

Figure 5:
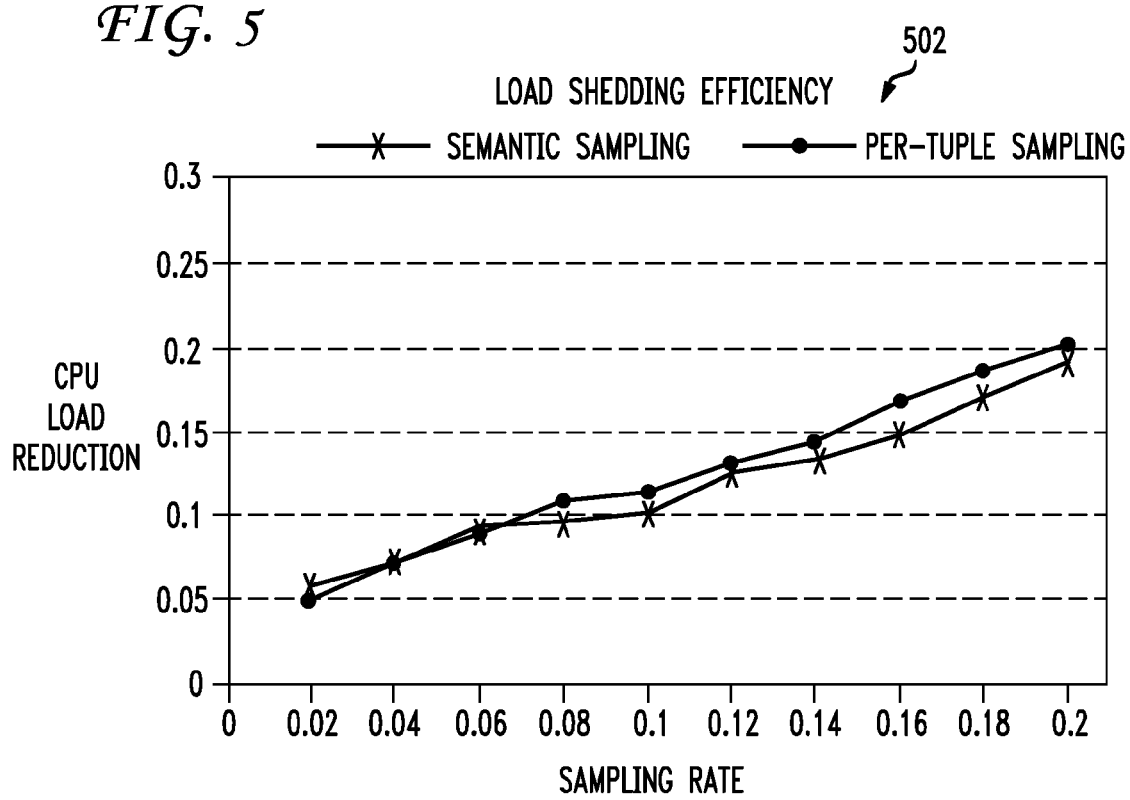
FIG. 5 illustrates a CPU load for different sampling methods.

The sampling rate was varied from 0.02 to 0.2 in 0.02 increments and observed the overall reduction in average CPU load for both semantic and per-tuple sampling. The results 502 of the experiments are presented in FIG. 5.

The results of the experiment confirm that sampling is an efficient load shedding strategy; varying the sampling rate from 0.02 to 0.2 the system was able to reduce the overall system load from 0.05 to 0.2. It is interesting to note that semantic sampling achieves slightly better load reduction than per-tuple sampling despite the fact that it uses a more expensive sampling predicate. The main reason behind phenomena is that per-group sampling for aggregation queries discards larger percentage of groups compared to per-tuple sampling with the same sampling rate. Since the cost of the execution of aggregation operator is largely determined by the number of groups in the output, semantic sampling is more efficient at reducing the load for aggregation queries.

Data Stream Management Systems (DSMS) processing high rate data steams are often subject to bursts of high activity, which might overload the system, and have to be robust.

This disclosure shows how to perform general-purpose query-aware sampling, which may be called semantic sampling. Methods for analyzing a large class of streaming operators and judiciously choosing sampling methods are shown that can guarantee semantically correct results. The single-operator techniques are extended to a general framework for analyzing any set of queries to determine a semantics-preserving sampling strategy. Since it is important for applications to know which sampling methods and sampling rates were used to compute the query results, special punctuations are imbedded into query output stream that would contain this information. The methods described herein can be extended to handle a larger suite of sampling algorithms, such as various types of "importance" sampling which aim to reduce the variance in approximations.

The semantic sampling approach is evaluated by running various sets of streaming queries on high-rate data streams. The results of the experiments confirm that the methods provide semantically correct and accurate results for scenarios where traditional per-tuple sampling fails to provide semantically meaningful results. Experiments show that semantic sampling is effective at reducing the overall system load, which makes it a valuable technique the load shedder can employ to guarantee the robustness and the correctness of the results under overload conditions.

The Inventors again not that the experimental data and discussion are for international purposes only and not to introduce any type of limitations on the claimed embodiments of the invention.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices. For example, a "system", computing device or hardware embodiment may comprise multiple variations of hardware components that store modules configured to control the respective computing device to perform the respective functions. Such hardware components, for example, processors, memory, communication systems, buses, etc. are know to those of skill in the art.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method of assigning sampling methods to each input stream for arbitrary query sets in a data stream management system, tile method comprising:
    splitting all query nodes in a query directed acyclic graph (DAG) having multiple parent nodes into sets of independent nodes having a single parent;
    computing via a processor a grouping set for every node in each set of independent nodes;
    reconciling each parent node with each child node in each set of independent nodes;
    reconciling between multiple child nodes that share a parent node; and
    generating a final grouping set based on the reconciliation between the multiple child nodes that share the parent node for at least one node describing how to sample an input stream for the at least one node.

2. The method of claim 1, further comprising labeling sampling unsafe nodes.

3. The method of claim 1, wherein the final grouping set comprises a labeling of each leaf node with a compatible sampling method.

4. The method of claim 1, wherein computing a grouping set for every node is performed using a single node grouping set analysis.

5. The method of claim 1, wherein the final grouping set for the at least one node further describes what records should be dropped by the data stream management system.

6. The method of claim 5, wherein the data stream management system implements the sampling associated with the final grouping set for at least one node based on a threshold associated with flow of data stream records.

7. A system for assigning sampling methods to each input stream for arbitrary query sets in a data stream management system, tile system comprising:
    a processor;
    a module configured to control the processor to split all query nodes in a query directed acyclic graph (DAG) having multiple parent nodes into sets of independent nodes having a single parent;
    a module configured to control the processor to compute a grouping set for every node in each set of independent nodes:
    a module configured to control the processor to reconcile each parent node with each child node in each set of independent nodes;
    a module configured to control the processor to reconcile between multiple child nodes that share
    a parent node; and
    a module configured to control the processor to generate a final grouping set based on the reconciliation between the multiple child nodes that share the parent node for at least one node describing how to sample an input stream for the at least one node.

8. The system of claim 7, further comprising a module configured to control the processor to label sampling unsafe nodes.

9. The system of claim 7, wherein the final grouping set comprises a labeling of each leaf node with a compatible sampling method.

10. The system of claim 7, wherein the module configured to control the processor to compute a grouping set for every node further computes the grouping set using a single node grouping set analysis.

11. The system of claim 7, wherein the final grouping set for the at least one node further describes what records should be dropped by the data stream management system.

12. The system of claim 11, wherein the data stream management system implements the sampling associated with the final grouping set for at least one node based on a threshold associated with flow of data stream records.

13. A computer readable storage medium storing instructions for controlling a computing device to assign sampling methods to each input stream for arbitrary query sets in a data stream management system, the instructions comprising:

splitting all query nodes in a query directed acyclic graph (DAG) having multiple parent nodes into sets of independent nodes having a single parent;

computing a grouping set for every node in each set of independent nodes;

reconciling each parent node with each child node in each set of independent nodes;

reconciling between multiple child nodes that share a parent node; and generating a final grouping set based on the reconciliation between the multiple child nodes that share the parent node for at least one node describing how to sample an input stream for the at least one node.

14. The computer readable storage medium of claim 13, the instructions further comprising labeling sampling unsafe nodes.

15. The computer readable storage medium of claim 13, wherein the final grouping set comprises a labeling of each leaf node with a compatible sampling method.

16. The computer readable storage medium of claim 13, wherein computing a grouping set for every node is performed using a single node grouping set analysis.

17. The computer readable storage medium of claim 13, wherein the final grouping set for the at least one node further describes what records should be dropped by the data stream management system.

18. The computer readable storage medium of claim 17, wherein the data stream management system implements the sampling associated with the final grouping set for at least one node based on a threshold associated with flow of data stream records.

* * * * *